United States Patent [19]
Plantan

[11] Patent Number: 5,497,742
[45] Date of Patent: Mar. 12, 1996

[54] DRIVE THROUGH CRANKSHAFT

[75] Inventor: Ronald S. Plantan, Charlotte, N.C.

[73] Assignee: Midland Brake, Inc., Kansas City, Mo.

[21] Appl. No.: 358,859

[22] Filed: Dec. 19, 1994

[51] Int. Cl.$^6$ .................................................. F02B 75/32
[52] U.S. Cl. ...................... 123/197.5; 123/198 R
[58] Field of Search ................... 123/198 R, 197.4, 123/197.5; 74/11, 15.63; 417/223

[56] References Cited

U.S. PATENT DOCUMENTS

| | | | |
|---|---|---|---|
| 3,435,694 | 4/1969 | Phinney | 74/361 |
| 4,453,625 | 6/1984 | Franks | 192/88 |
| 4,505,185 | 3/1985 | Jacobs | 91/491 |

FOREIGN PATENT DOCUMENTS 57-5517  1/1982  Japan .................. 123/198 R

*Primary Examiner*—Noah P. Kamen
*Attorney, Agent, or Firm*—St. Onge Steward Johnston & Reens

[57] ABSTRACT

A crankshaft assembly provides a combination of a clutched hollow crankshaft for driving a reciprocating device with a driveshaft for driving another device. The drive shaft extends through the crankshaft and is powered by the same flywheel as is used to drive the crankshaft. The assembly permits selective transmission of power to those devices only when they need power. In the preferred embodiment, the drive shaft provides continuous power while the crankshaft provides power as needed by engaging and disengaging the crankshaft clutch.

16 Claims, 2 Drawing Sheets

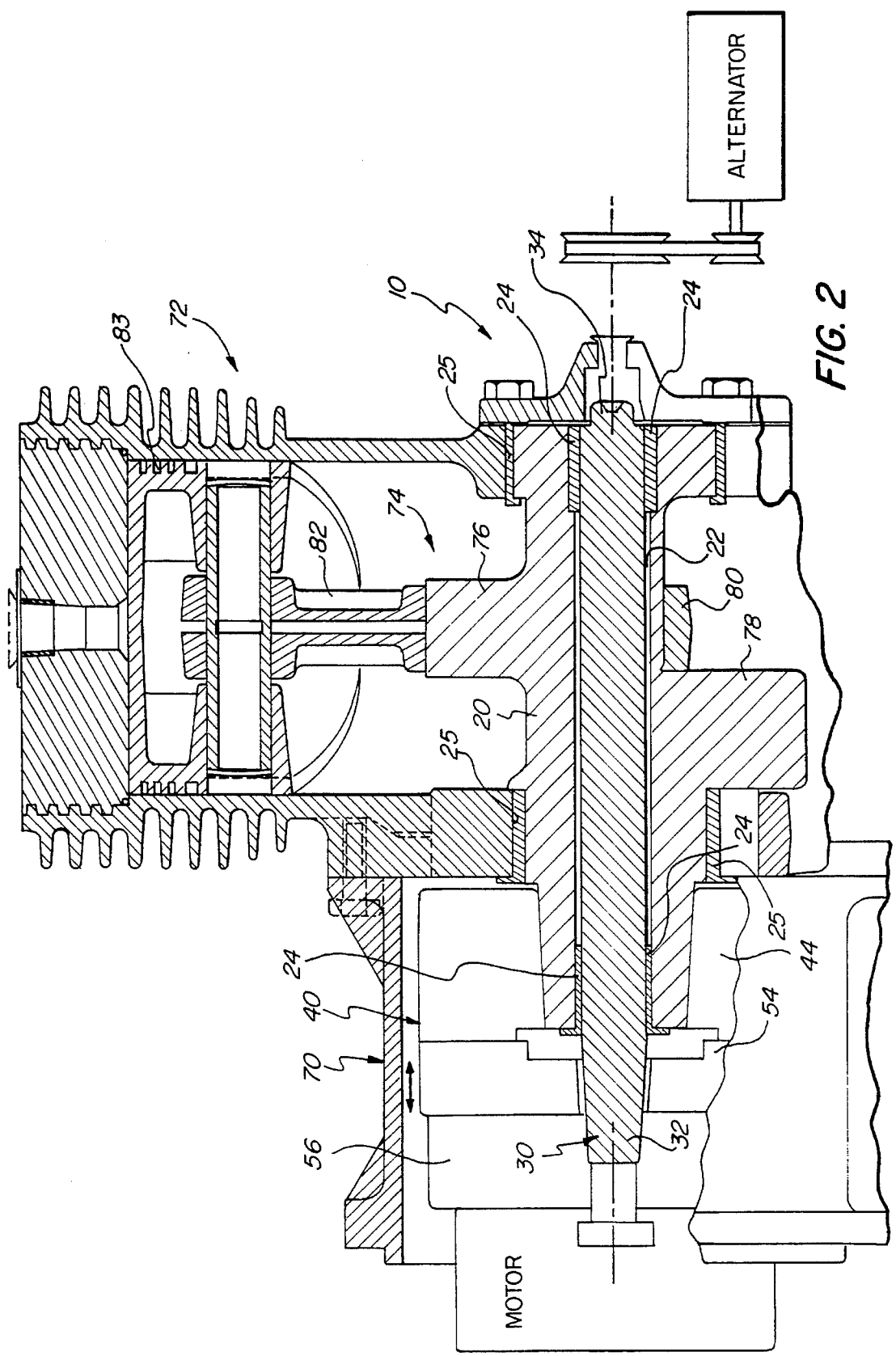

DRIVE THROUGH CRANKSHAFT

FIELD OF THE INVENTION

This invention relates to the field of devices for transmission of mechanical power, and in particular, devices for controlling power delivered to multiple devices by a crankshaft in a motor vehicle.

BACKGROUND OF THE INVENTION

It has been known in the past to drive multiple devices using rotational power supplied to a crankshaft in a motor vehicle. For example, multiple rotating devices, or a reciprocating device such as a cam follower and a rotating device may be both driven from the same crankshaft. This is seen, for example, in tractors for pulling trailers, which may have a reciprocating piston of an air compressor (to operate pneumatic brakes) powered by the crankshaft that also powers an alternator or another pump or compressor.

It would be desirable if power transmission to such separate devices could be independently controlled. For example, there are often situations where one device to be powered (such as an alternator) must be continuously supplied with rotational power, while another such device (such as an air compressor) needs only periodic power. In prior art devices, it is typically necessary to continuously run both devices, i.e., in the example, both the alternator and the air compressor. Even if the air compressor is run in an "unloaded" mode (i.e., not discharging air under pressure), the compressor continuously consumes energy, consumes lubricating oil, and undergoes wear and tear.

It would be desirable if an apparatus could be provided in such situations to permit a device such as the air compressor to be disengaged from the power source while leaving another device such as an alternator engaged with the power source. This would have the benefit of providing better energy efficiency in the motor vehicle (and therefore better fuel economy) by disengaging the device such as the compressor while still leaving the other device such as the alternator operative. Otherwise, in order to disengage the compressor, the other device must also be disengaged, which is obviously undesirable in that it will interfere with proper functioning of the motor vehicle such as a tractor. For example, excessive disengagement of the alternator will cause the batteries to discharge without recharging, creating attendant problems with electrical system components such as lights, ignition, etc.

SUMMARY OF THE INVENTION

It is an object of the present invention to provide within a single apparatus a combination that permits separate control of mechanical power transmitted to two devices.

It is another object to provide a crankshaft combination that is adapted to provide both reciprocating and rotational power to two different devices.

These and other objects are met by a drive through crankshaft assembly in accordance with an embodiment of the invention, comprising a hollow crankshaft having a cylindrical bore extending axially therethrough; and a separate drive shaft extending through the cylindrical bore of the crankshaft. A clutch having a drive side and a driven side is provided, with the clutch driven side engaged to the crankshaft so that the transmission of power to the crankshaft is controlled by the clutch. The drive shaft is operably connected to the drive side of the clutch to continuously operate the drive shaft without being dependent on engagement of the clutch. An eccentric power transmission system is preferably provided with the crankshaft to translate rotation of the crankshaft into reciprocal motion to power a first device. The drive shaft is preferably connected to a second device so that the second device is continuously powered by rotation of the drive shaft.

In one preferred embodiment, the translation of rotation of the crankshaft into reciprocal motion to power the first device is accomplished by the combination of at least one eccentric lobe extending radially outwardly from at least one part of an outer wall of the crankshaft, and a mating cam follower and/or connecting rod, which is affixed to the first device, which receives and follows the path of the crankshaft eccentric lobe. Rotation of the crankshaft causes the lobe to rotate and the cam follower and/or connecting rod to travel in a path around the axis of the crankshaft, thereby causing the first device to reciprocate.

Most preferably, the first device comprises an air compressor, and the second device is a pump or electrical alternator.

Other objects, aspects and features of the present invention in addition to those mentioned above will be pointed out in or will be understood from the following detailed description provided in conjunction with the accompanying drawings.

BRIEF DESCRIPTION OF THE DRAWINGS

The present invention may be more clearly understood from the following description of a specific and preferred embodiment read in conjunction with the accompanying detailed drawings; wherein:

FIG. 2 is a cross-sectional schematic side view of a drive through crankshaft and clutch in accordance with the invention.

DETAILED DESCRIPTION OF DRAWINGS

Figure 1:
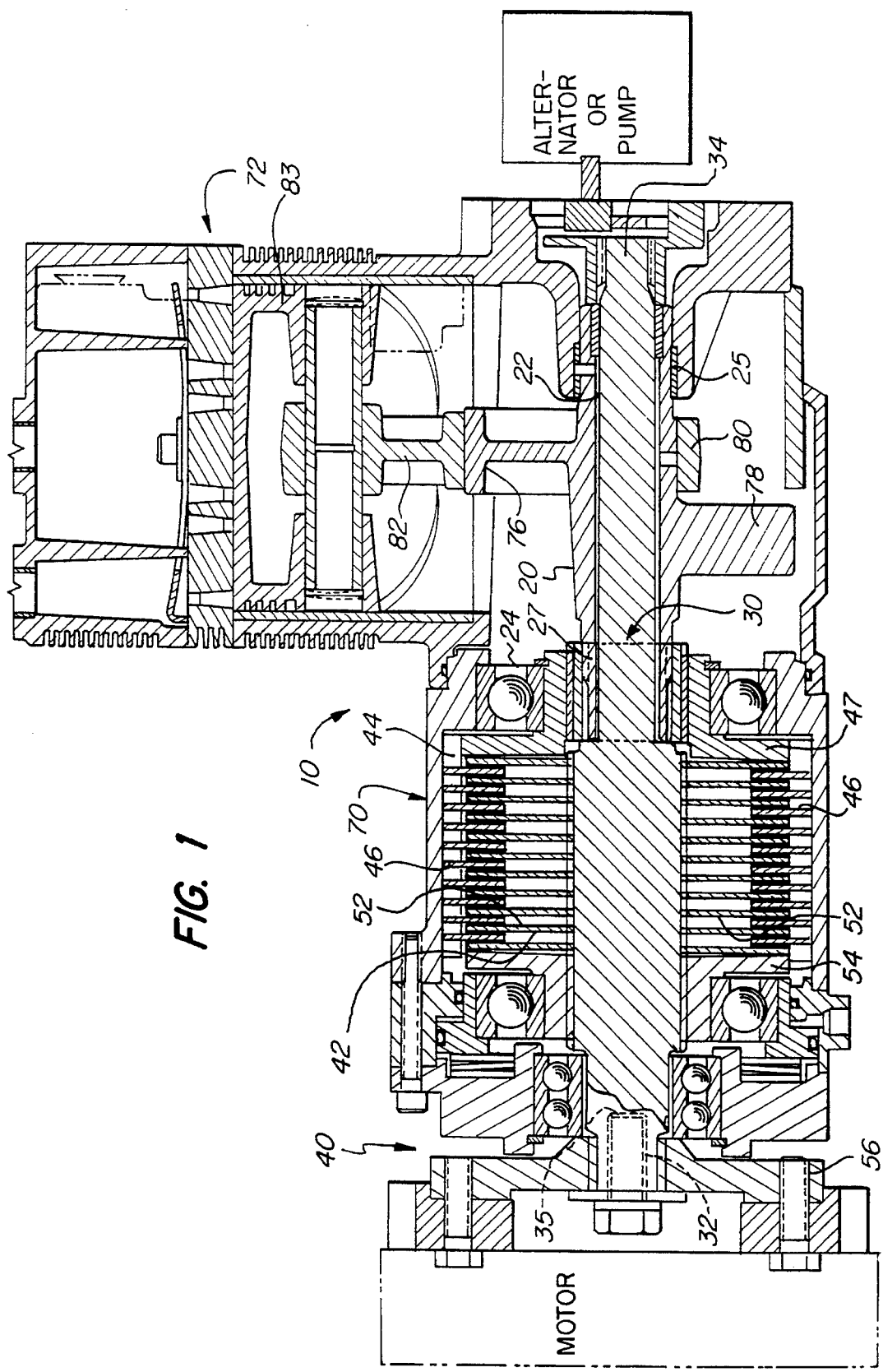
FIG. 1 is a cross-sectional side view of an embodiment of a drive through crankshaft in accordance with the invention.

Referring to FIGS. 1–2, where like numbers refer to like elements in the drawings, a crankshaft assembly 10 is shown. Crankshaft assembly 10 includes a hollow crankshaft 20 and a drive shaft 30 contained within housing 70. Crankshaft 20 has a cylindrical bore 22 extending axially therethrough. Crankshaft 20 is rotatably supported in housing 70, for example, by ball bearings 24 and/or seals 25.

Crankshaft 20 is adapted to be engaged and disengaged from a power source such as the motor of a motor vehicle by clutch 40. Clutch 40 is a conventional clutch and has a drive side 42 and a driven side 44. Clutch 40 may comprise a typical clutch assembly comprised of friction plates 46 engaged to the crankshaft 20 by a plate holder 47 having a central splined aperture for receiving the splined end 27 of crankshaft 20. The friction plates 46 frictionally engage with plates 52 and are clamped by pressure plate 54. Drive shaft 30 is engaged to a flywheel 56. Flywheel 56 is powered by the motor of the motor vehicle in which crankshaft assembly 10 is mounted.

Drive shaft 30 is operable as the drive side of the clutch 40 to continuously rotate the clutch drive side when the drive shaft 30 is rotated. In one preferred embodiment, drive shaft 30 is secured to flywheel 56 at its driven end 32 and rotates whenever flywheel 56 is rotated by power from the motor. Drive shaft end 32 may be secured by a bolt 35 or the like extending through flywheel 56. Drive shaft 30 extends through bore 22 of crankshaft 20 to operate a second device engaged to driven end 34 of drive shaft 30.

Flywheel 56, when caused to rotate by the motor, rotates the driven side 44 of clutch 40 when clutch 40 is engaged, and thereby causes rotation of crankshaft 20, while simultaneously, the drive shaft 30 is connected to the drive side of the clutch 40 and is continuously rotated thereby.

The rotation of crankshaft 20 is translated into reciprocal motion to power an air compressor 72. The mechanism for translation of the rotational to reciprocal motion preferably comprises an eccentric lobe/connecting rod combination 74 as shown in FIGS. 1 and 2.

Referring to FIGS. 1 and 2, an eccentric lobe 76 is integrally formed during casting on one side of crankshaft 20. Lobe 76 may also be fabricated onto crankshaft 20. Lobe 76 extends radially outwardly from crankshaft 20. Lobe 76 is generally circular, but is eccentrically located relative to the axis of the crankshaft 20, so that the lobe 76 appears to move up and down as the crankshaft 20 is rotated. Preferably there is a counterbalancing lobe 78 as well to balance the stress and torque on crankshaft 20. Lobe 76 has rotatably fitted around it a lower end 80 of connecting rod 82. Lower end 80 surrounds the eccentric lobe 76. Connecting rod 82 is a rigid body that is connected to piston 83 of air compressor 84. Alternatively, a cam follower may be used. Accordingly, as crankshaft 20 is rotated, the eccentric lobe/connecting rod 74 causes the piston 83 to move up and down.

Another embodiment of a mechanism for translation comprises an offset member which extends from a free end of the crankshaft. The offset member has extending from it a mounting stem rotatably coupled to the offset member. The stem is positioned in a location offset from the axis of the crankshaft. A rod is pivotally affixed to the mounting stem. Rotation of the crankshaft causes the offset member to rotate and the mounting stem to travel in a path around the axis of the crankshaft, thereby causing the piston to reciprocate in a linear path.

Conventional means, for example: a belt drive, a gear drive, and clutched and non-clutched power transfer connections may be provided to connect the drive shaft 30 to a second device, such as an alternator or pump, to transmit mechanical power from the drive shaft 30 to the second device.

In an alternative embodiment of the invention, crankshaft 20 and driveshaft 30 may be clutched in series. In such case, either of the shafts 20 and 30 could be designated the primary powered shaft. The primary powered shaft would then be clutched to the power source or motor. The second shaft would be clutched to the first shaft, and would operate only when the two necessary conditions were fulfilled, i.e., the clutch to the primary powered shaft was engaged, and the clutch from the primary powered shaft to the second shaft was also engaged. This embodiment is embodied in a device in which the hollow crankshaft is clutched to the power source and the drive shaft is clutched to the hollow crankshaft.

In another embodiment of the invention, the hollow tubular crankshaft 20 is coupled directly to the power source and operates continuously, and the driveshaft 30 is clutched to the crankshaft 20 to provide power when it is desired for a second device.

The drive through crankshaft assembly of the present invention comprises a unique solution to the problem of driving several devices that have different power needs, thereby enhancing energy efficiency and in motor vehicles, and provides an improvement over prior art devices in the field.

In particular, the present invention provides the ability to provide power even if a primary device is disengaged. It eliminates unnecessary wear on a primary device when the device is not in use. Where the primary device is an air compressor, this reduces power consumption and lubricant consumption. Further, in such a compressor, the device permits control of the air discharge pressure without the use of other devices.

I claim:

1. A drive through crankshaft assembly, comprising:
   a hollow crankshaft having a cylindrical bore extending axially therethrough;
   a drive shaft extending through said cylindrical bore of said crankshaft;
   means for connecting said crankshaft to a first device to transmit mechanical power from said crankshaft to said first device;
   means for connecting said drive shaft to a second device to transmit mechanical power from said drive shaft to said second device;
   a clutch for engaging and disengaging with one of said crankshaft and said drive shaft to selectively provide or remove rotational power thereto;
   a means for transmitting rotational power to the other of said crankshaft and said drive shaft.

2. A drive through crankshaft assembly in accordance with claim 1, wherein said clutch has a drive side and a driven side, said driven side being engaged with an end of said crankshaft to rotate said crankshaft when said clutch drive side is rotating and said clutch is engaged.

3. A drive through crankshaft assembly, in accordance with claim 2, wherein said second device comprises an alternator or a pump.

4. A drive through crankshaft assembly, in accordance with claim 2, wherein said clutch drive side is operably connected to and driven by a motor of a motor vehicle.

5. A drive through crankshaft assembly in accordance with claim 1, wherein said means for connecting said crankshaft to a first device translates rotation of said crankshaft into reciprocal motion to power said first device.

6. A drive through crankshaft assembly in accordance with claim 5, wherein said means for translating rotation of said crankshaft into reciprocal motion to power said first device comprises:
   at least one eccentric lobe extending radially outwardly from at least one part of an outer wall of said crankshaft;
   a connecting rod having a base end for receiving said crankshaft eccentric lobe, said connecting rod being affixed to said first device.

7. A drive through crankshaft assembly, in accordance with claim 5, wherein said first device comprises an air compressor.

8. A drive through crankshaft assembly, comprising:
   a hollow crankshaft having a cylindrical bore extending axially therethrough;
   means for rotatably supporting said crankshaft;
   a clutch, said clutch having a drive side and a driven side, said driven side being engaged to an end of said crankshaft to rotate said crankshaft when said clutch drive side is rotating and said clutch is engaged;
   means for translating rotation of said crankshaft into reciprocal motion to power a first device;

a drive shaft extending through said cylindrical bore of said crankshaft;

said drive shaft being operably connected to said drive side of said clutch to continuously rotate said drive shaft when said clutch drive side is rotated;

means for connecting said drive shaft to a second device to transmit mechanical power from said drive shaft to said second device.

9. A drive through crankshaft assembly, in accordance with claim 8, wherein said means for translating rotation of said crankshaft into reciprocal motion to power said first device comprises:

at least one eccentric lobe extending radially outwardly from at least one part of an outer wall of said crankshaft;

a connecting rod, said connecting rod having a base end for receiving said crankshaft eccentric lobe, said connecting rod being affixed to said first device.

10. A drive through crankshaft assembly, in accordance with claim 9, wherein said clutch drive side is operably connected to and driven by a motor of a motor vehicle.

11. A drive through crankshaft assembly, in accordance with claim 8, wherein said first device comprises an air compressor.

12. A drive through crankshaft assembly, in accordance with claim 8, wherein said second device comprises a device selected from a group comprising an alternator and a pump.

13. A drive through crankshaft assembly, comprising:

a housing;

a hollow crankshaft having a cylindrical bore extending axially therethrough;

means for rotatably supporting said crankshaft in said housing;

a clutch, said clutch having a drive side and a driven side, said driven side being engaged to an end of said crankshaft to rotate said crankshaft when said clutch drive side is rotating and said clutch is engaged, said clutch drive side being operably connected to and driven by a motor of a motor vehicle;

means for translating rotation of said crankshaft into reciprocal motion to power a first device;

a drive shaft extending through said cylindrical bore of said crankshaft;

said drive shaft being operably connected to said drive side of said clutch to continuously rotate said drive shaft when said clutch drive side is rotated;

means for connecting said drive shaft to a second device to transmit mechanical power from said drive shaft to said second device.

14. A drive through crankshaft assembly, in accordance with claim 13, wherein said means for translating rotation of said crankshaft into reciprocal motion to power said first device comprises:

at least one eccentric lobe extending radially outwardly from at least one part of an outer wall of said crankshaft;

a connecting rod, said connecting rod having a base end for receiving said crankshaft eccentric lobe, said connecting rod being affixed to said first device.

15. A drive through crankshaft assembly, in accordance with claim 14, wherein said first device comprises an air compressor.

16. A drive through crankshaft assembly, in accordance with claim 15, wherein said second device comprises a device selected from a group comprising an alternator and a pump.

* * * * *